P. J. FLEMING & R. L. DICKS.
CAPSULE FILLER.
APPLICATION FILED JAN. 24, 1918.

1,267,201.

Patented May 21, 1918.
2 SHEETS—SHEET 1.

WITNESSES
Edw. Thorpe
A. L. Kitchin

INVENTORS
P. J. Fleming
R. L. Dicks
BY
ATTORNEYS

P. J. FLEMING & R. L. DICKS.
CAPSULE FILLER.
APPLICATION FILED JAN. 24, 1918.
1,267,201.
Patented May 21, 1918.
2 SHEETS—SHEET 2.
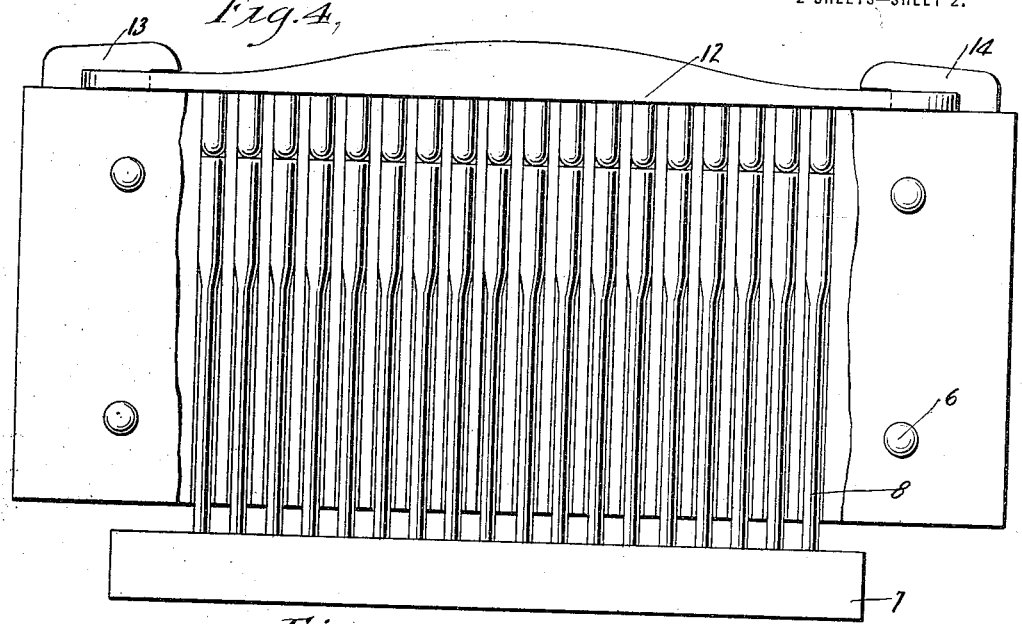
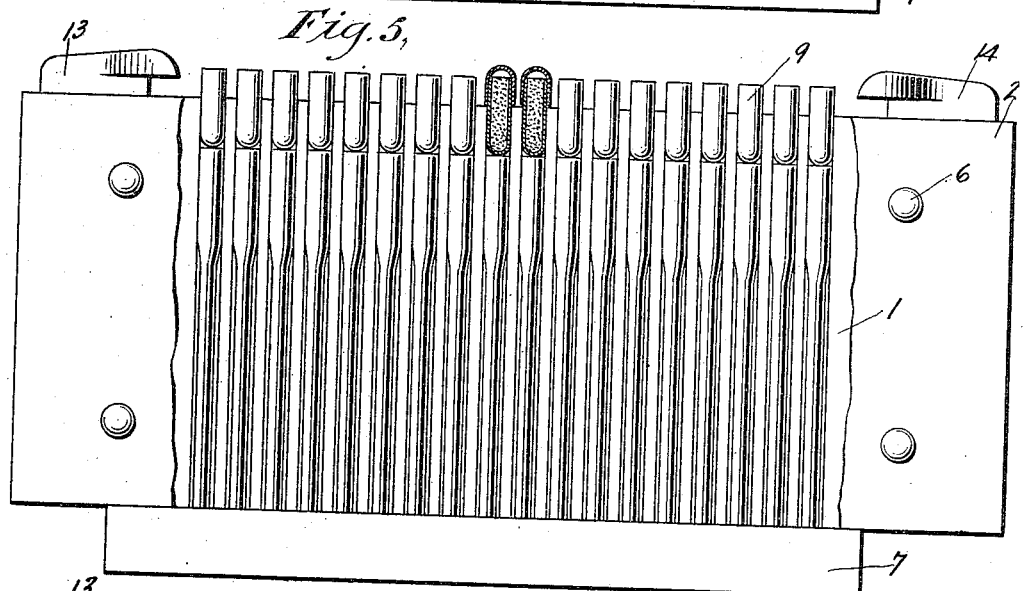
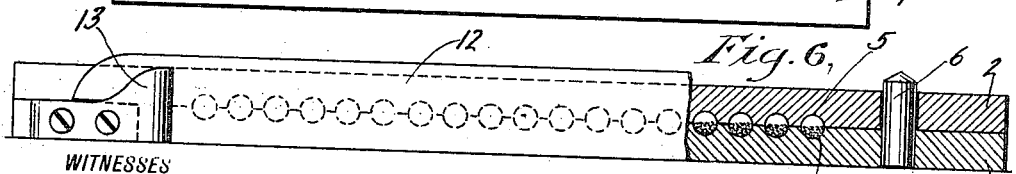
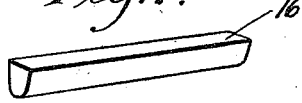

UNITED STATES PATENT OFFICE.

PAUL JOSEPH FLEMING, OF ST. MARTINVILLE, AND ROBERT LEE DICKS, OF LAKE CHARLES, LOUISIANA.

CAPSULE-FILLER.

1,267,201.   Specification of Letters Patent.   Patented May 21, 1918.

Application filed January 24, 1918. Serial No. 213,530.

*To all whom it may concern:*

Be it known that we, PAUL J. FLEMING, a citizen of the United States, and a resident of St. Martinville, in the parish of St. Martin, and ROBERT L. DICKS, a citizen of the United States, and a resident of Lake Charles, in the parish of Calcasieu, both in the State of Louisiana, have invented a new and Improved Capsule-Filler of which the following is a full, clear, and exact description.

This invention relates to filling devices, and particularly to a device for filling capsules, and has for an object the provision of an improved arrangement whereby one or a large number may be filled quickly and accurately.

Another object in view is to provide a structure wherein a number of capsules may be filled with exactly the same amount without the use of complicated weighing or measuring devices.

A still further object of the invention, more specifically, is to provide a filler with a plurality of grooves and means for measuring quantities of material in said grooves after which the measured material may be forced into the capsules by follower plungers without removing the material from the grooves.

In the accompanying drawings:

Fig. 4 is a view similar to Fig. 3 except that most of the upper section has been broken away and the plungers have been placed in position.

Fig. 5 is a view similar to Fig. 4 showing a completely filled capsule ready for removal.

Fig. 6 is a sectional view through Fig. 3 on line 6—6.

Fig. 7 is a perspective view of a measuring or stamping device embodying certain features of the invention.

Figure 1:
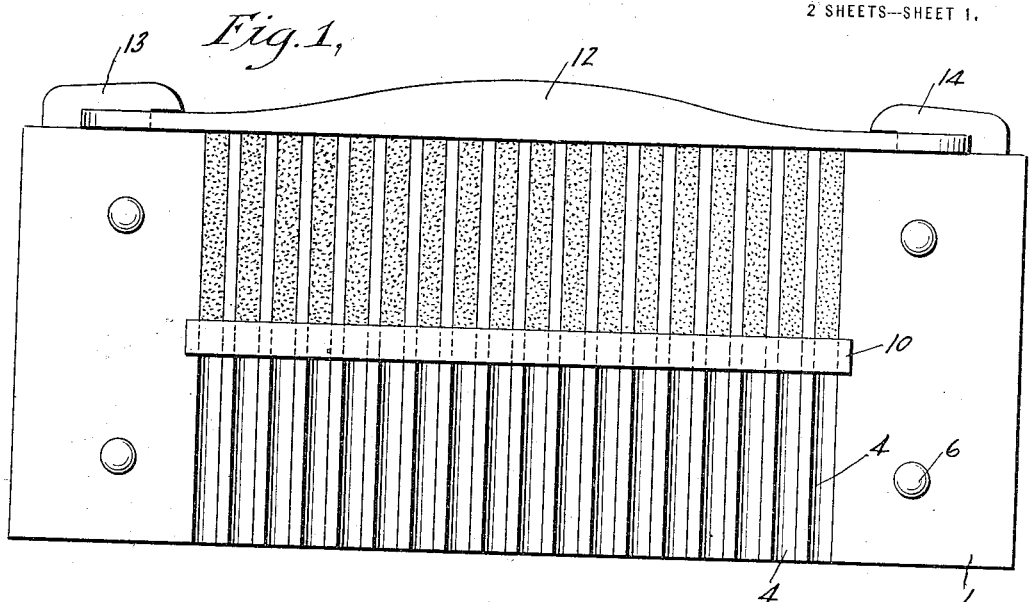
Figure 1 is a plan view of a filler with the top section removed.
Figure 2:
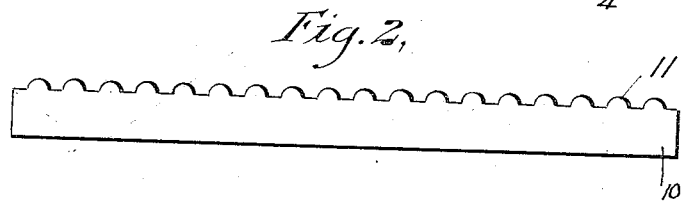
Fig. 2 is an elevation of a measuring or sizing guide.
Figure 3:
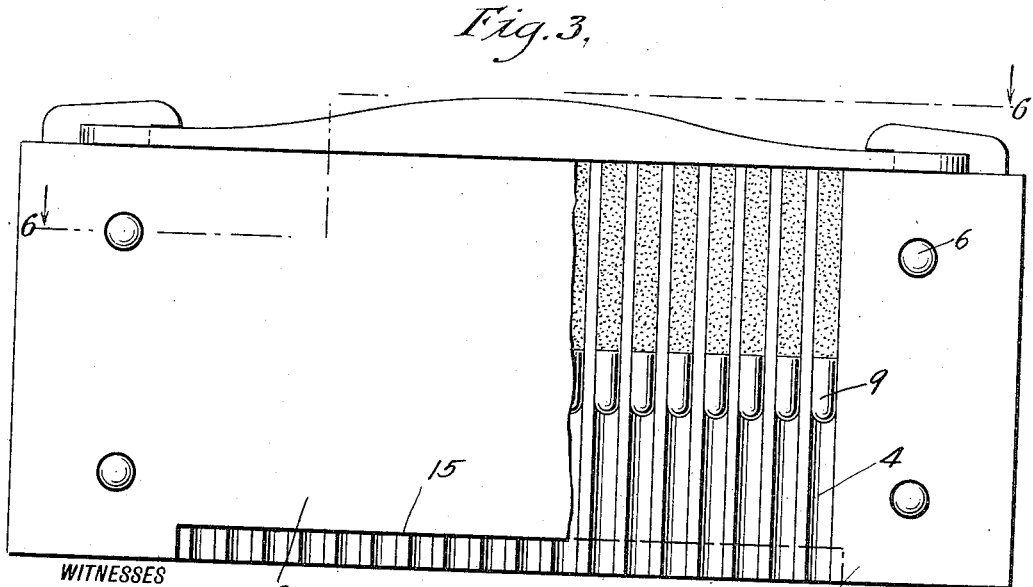
Fig. 3 is a top plan view of the device with both the upper and lower sections in place, and the upper section shown broken away.

Referring to the accompanying drawings by numerals 1 and 2 indicate the filling sections formed of any desired material and provided with a number of grooves 4 and 5, which when brought into register, as shown in Fig. 6, produce round openings or bores extending entirely through the sections from one edge to the other. A plurality of guiding pins 6 are rigidly secured in any suitable manner to section 1 and extend loosely through apertures in section 2, whereby section 2 is properly centered so that the grooves 4 and 5 will register. Associated with these sections is a rammer 7 provided with a cross bar to which a plurality of ram rods 8 are secured, there being one ram rod for each pair of grooves so as to force the various capsules 9 from the position shown in Fig. 3 to that shown in Figs. 4 and 5. When using the device the section 2 is removed and the guide 10 is placed on section 1 so that the projections 11 of the guide will fit into the grooves 4. This will divide the upper and lower part of the groves so that the powder or other material of any kind may be placed in the grooves 4 as shown in Fig. 1 and properly spread by any suitable means until all the grooves have the same amount and are filled to the top as shown in Fig. 6 and any excess powder or other material is wiped off so that each groove contains exactly the same quantity. Before the powder or other material has been placed in position not only is the guide 10 placed as shown in Fig. 1, but a stop 12 is placed in position, said stop fitting snugly against section 1 and extending above the same sufficiently to overlap section 2, after which said section is placed in position as shown in Fig. 6. Retaining hook members 13 and 14 are provided on section 1, said hook members interlocking with the stop 12. After the parts have been arranged as shown in Fig. 1 and the medicine supplied thereto section 2 is then applied as shown in Figs. 3 and 6, after which the long ends of the capsules are positioned in the bores provided by grooves 4 and 5. Section 2 is provided with a notch 15 as shown in Fig. 3 so that the ends of the rammers 8 may be easily inserted and when inserted the rammer is moved upwardly until the rammers contact with the capsules 9. The rammers are moved more or less slowly until they eventually assume the position shown in Fig. 4, whereupon it will be observed they have scooped all of the material in the various grooves and said material has been compressed in the capsules. The stop 12 is then removed and the capsules moved a little farther as shown in Fig. 5, after which caps are fitted over the various capsules and then the filled capsule is removed. By providing the structure just described, not only can the capsule be filled more quickly, but all of the capsules are supplied with the same amount of medicine which is difficult to do when filling by hand.

In some instances it is not desired to use all of the grooves 4 whereupon the filler block 16 is fitted into one of the grooves, as for instance the center groove and guide 10 placed in position. The medicine is then placed in the desired set of grooves and leveled up as above described after which the filler block 16 is removed and section 2 placed in position. The operation from then on is the same as when the grooves are all used.

It is evident that different quantities could be provided by shifting the guide 10 back and forth, and by providing a device with different sized grooves different sized capsules could be filled without departing from the spirit of the invention.

What we claim is:

1. A capsule filler comprising a principal grooved section for receiving the matter to be placed in the capsules, a guide for limiting said matter so that the same quantity may be supplied to each capsule, a rammer formed with a ram rod for each of the grooves in said section for forcing capsules along said grooves and thereby scooping up said material before the capsules are forced out of said grooves and an auxiliary grooved section coacting with the principal grooved section for holding the capsules therein during a movement along the grooves, and while caps are being supplied thereto.

2. A capsule filler comprising a grooved member for receiving matter to be placed in capsules, a grooved covering section for the grooved member, the grooves in said grooved member and said covering section registering to make tubular openings, a rammer provided with a ram rod for each tubular opening for forcing capsules along said tubular openings and out one end thereof, a stop arranged at the edge of said member and said section to prevent the exit of said capsules whereby said matter is compressed in the capsules against said stop, said stop being adapted to be removed previous to the removal of the capsules.

3. A capsule filler comprising a measuring structure including grooved sections, one of said sections having a cutaway portion for disclosing one set of said grooves, a rammer provided with spaced ram rods adapted to fit into said disclosed grooves in order to force capsules along said grooves collecting and compressing matter therein into the capsules, said rammer being of sufficient length to force said capsules a short distance beyond said sections for receiving caps, and a stop for preventing said capsules from moving beyond the sections during the filling action.

4. A filler comprising two grooved plates, guides arranged on said plates and extending loosely from the plates and causing the plates to fit so as to cause the grooves to register, a pair of hook members on said plates, a rammer provided with ram rods fitting in said grooves for forcing the capsules therethrough, and a stop held in place by said hooks for preventing the escape of the matter in the grooves during the movement of the capsules therethrough.

5. A capsule filler comprising a pair of plates having grooves extending from one edge to the other meeting when the plates are together for forming tubular bores designed to receive powder or granular matter to be placed in capsules, one of said plates having a notch for disclosing the grooves in the opposite plate whereby capsules may be readily placed in said bores, and a rammer provided with ram rods to be placed in said bores, said notch facilitating the placing of said rams in said bores, means movably positioned on the opposite edge of said plates to said notch for preventing the powder or granular matter from moving out of the bores when the capsules are forced toward that end of the bores whereby said granular and powdered matter will be forced into said capsules, said rams being of sufficient length to force part of said capsules beyond the edge of said plates when the stop has been removed, whereby caps may be placed thereon.

PAUL JOSEPH FLEMING.
ROBERT LEE DICKS.